Patented Apr. 10, 1951

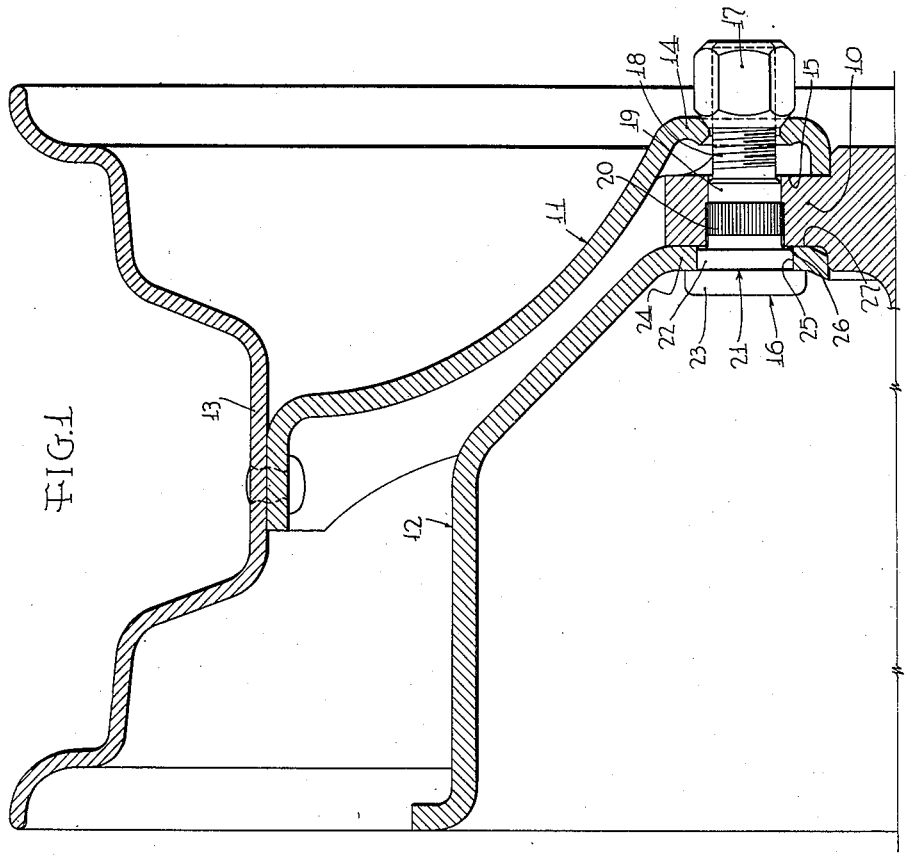
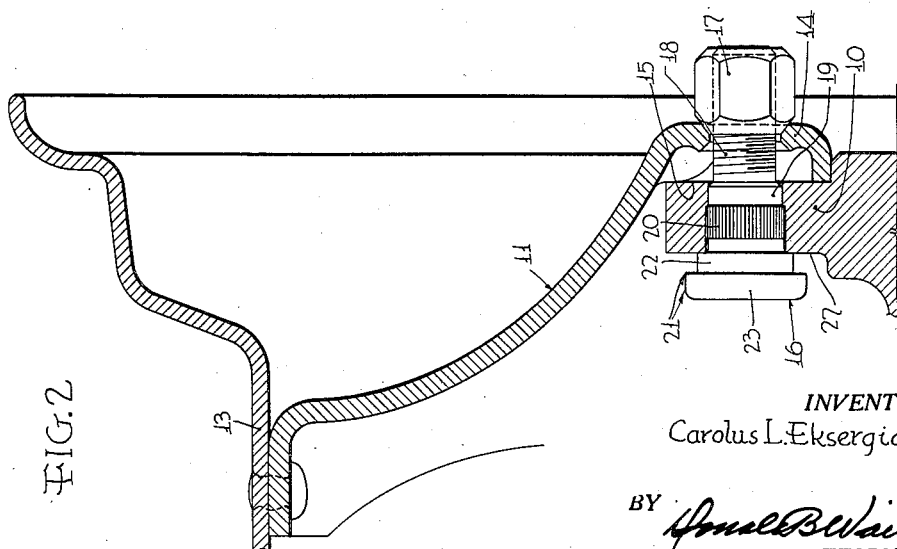

2,548,840

UNITED STATES PATENT OFFICE 2,548,840

STUD FOR MOUNTING WHEELS
OR THE LIKE

Carolus L. Eksergian, Detroit, Mich., assignor to
The Budd Company, Philadelphia, Pa., a corporation of Pennsylvania Application August 13, 1946, Serial No. 690,285

2 Claims. (Cl. 301—6)

The invention relates to wheels and more particularly to wheels in which the wheel body is demountably secured to a hub.

Such wheel bodies are ordinarily secured to the outboard face of a hub flange by an annular series of studs and nuts extending through holes in the hub flange, the studs being suitably restrained against rotation when the nuts are tightened to clamp the wheel body in place. Wheels and hubs of this class are sometimes provided with brake drums and sometimes without. Where brake drums are used the same studs securing the wheel bodies in place may also be used to secure the brake drum in place. It has been the practice, heretofore, to provide two different lengths studs, one for use with hubs without brake drums and one for use with brake drums. In farm machinery, such as tractors, the front wheels are ordinarily without brake drums, while the rear wheels are provided with such drums. It becomes necessary for the manufacturer and the farmer to have on hand two different lengths of studs for use with the respective front and rear wheels of the same vehicle.

It is an object of the invention to overcome this defect and simplify the manufacture and the cost of operation and this is accomplished according to the invention by providing a single type of stud for use with wheels with or without brake drums. The radially outer configuration of the hub on which the wheel body or the wheel body and brake drum are mounted may be the same so that the improved stud can be used interchangeably with each hub.

In the drawings:

Fig. 1 is a partial section through the axis of a wheel according to the invention equipped with a brake drum, and Fig. 2 is a similar section through a wheel without a brake drum, the section in each case being taken through one of the securing studs and nuts.

According to the embodiment shown, the hub flange, formed by a forging or a casting, is designated by 10, the wheel body, shown in this instance as a sheet metal disc, by 11 and the brake drum, shown as having a sheet metal mounting portion, by 12. The wheel body is shown carrying the rim 13 on its outer periphery. The wheel body is provided with an annular bolting-on flange portion 14 of suitable configuration, this portion being clamped against the outboard face 15 of the hub flange 10 by the annular series of studs, as 16 and nuts, as 17. The studs 15 have an outer screw threaded portion 18 for receiving the nuts 17. Inwardly of the screw-threaded portion 18 is provided a slightly enlarged intermediate portion 19 passing through a hole in the hub flange and provided with a splined portion 20 which is tightly driven into the hole so as to form a firm interlock therewith to lock the stud against rotation. Inwardly of the portion 19 the stud is formed with a head section 21 which is comprised of an outer smaller diameter portion 22 and an inner larger diameter portion 23. The width of the smaller diameter portion 22 is preferably less than the thickness of the mounting portion 24 of the brake drum, and this mounting portion is provided with a hole 25 large enough to receive it. With the brake drum mounted in place the inner larger head portion 23, consequently, clamps the mounting portion of the brake drum securely in place, since a slight space 26 exists between the shoulder formed by the portion 22 and the inboard mounting face 27 of the hub flange.

As shown in Fig. 2, when the same stud is used with a hub having no brake drum mounted thereon, the stud is driven a slight distance further into the hole in the hub flange until the shoulder formed by the portion 22 seats against the inboard face 27 of the hub flange. The wheel body is secured in substantially the same way as in the form shown in Fig. 1.

It will be seen that the stud has substantially the same axially wide seating engagement with the hub flange and the same interlocking engagement against rotation when used with or without a brake drum, and thus operates with substantially equal efficiency in either case.

While a specific embodiment of the invention has been herein described in detail, it will be understood that changes and modifications may be made by those skilled in the art without departing from the main features of the invention, and such changes and modifications are intended to be covered by the appended claims.

What is claimed is:

1. In combination, a hub having a radial flange, a seat on the inboard face of said flange for securing a brake drum and a seat on the outboard face of said flange for securing a wheel body, and a securing stud extending through said flange, non-rotatably secured in a hole therein and cooperating with a nut to clamp the brake drum and wheel body to their respective seats on the hub flange, said stud being interchangeably usable with or without a brake drum mounted on the hub and having a stepped-head portion, the smaller diameter head portion being adopted to fit a hole in the brake drum, and being of less width than the thickness of the metal of said drum, whereby the drum may be securely clamped by the larger diameter head portion of said stud against its seat on the hub flange, said smaller diameter head portion of said stud being adapted to seat against the inboard face of the hub flange when the stud is used on a hub without a brake drum.

2. In combination, a first wheel part having a radially extending portion, a seat on one face of said portion for securing a second wheel part and a seat on the other face of said portion for securing a third wheel part, and a securing stud extending through said portion, non-rotatably secured in a hole therein and cooperating with a nut to clamp said second and third wheel parts to their respective seats on said portion, said stud being interchangeably usable with or without said second wheel part mounted on said first wheel part and having a stepped-head portion, the smaller diameter head portion being adapted to fit a hole in said second wheel part, and being of less width than the thickness of the metal of said second wheel part, whereby said second wheel part may be securely clamped by a larger diameter head portion of said stud against its seat on the radially extending portion of said first wheel part, said smaller diameter head portion of said stud being adapted to seat against said one face of said radially extending portion when the stud is used on a first wheel part without a second wheel part.

CAROLUS L. EKSERGIAN.

REFERENCES CITED

The following references are of record in the file of this patent:

UNITED STATES PATENTS

| Number | Name | Date |
|---|---|---|
| 914,327 | Barbour | Mar. 2, 1909 |
| 944,288 | Smith | Dec. 28, 1909 |
| 1,383,630 | Hoagland | July 5, 1921 |
| 1,995,746 | Nelson | Mar. 26, 1935 |
| 2,115,365 | Hogg | Apr. 26, 1938 |
| 2,130,392 | Horn | Sept. 20, 1938 |
| 2,345,910 | Fawcett | Apr. 4, 1944 |
| 2,352,487 | McNamara | June 27, 1944 |